Dec. 28, 1965        H. BARUCH ETAL            3,225,645
           CUVETTE AND SUPPLY SYSTEM THEREFOR
Filed Oct. 4, 1962                          2 Sheets-Sheet 2
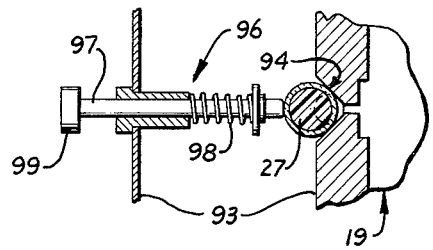
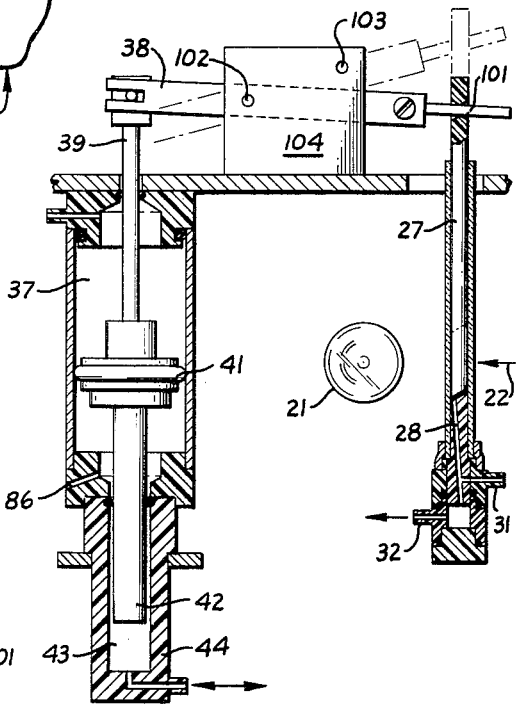
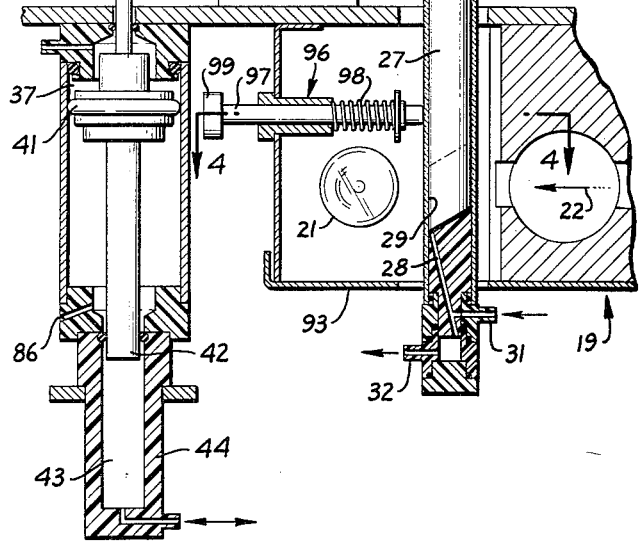
INVENTORS
HANS BARUCH
ERIK W. ANTHON
BY Schapp & Hatch
ATTORNEYS

United States Patent Office 3,225,645
Patented Dec. 28, 1965

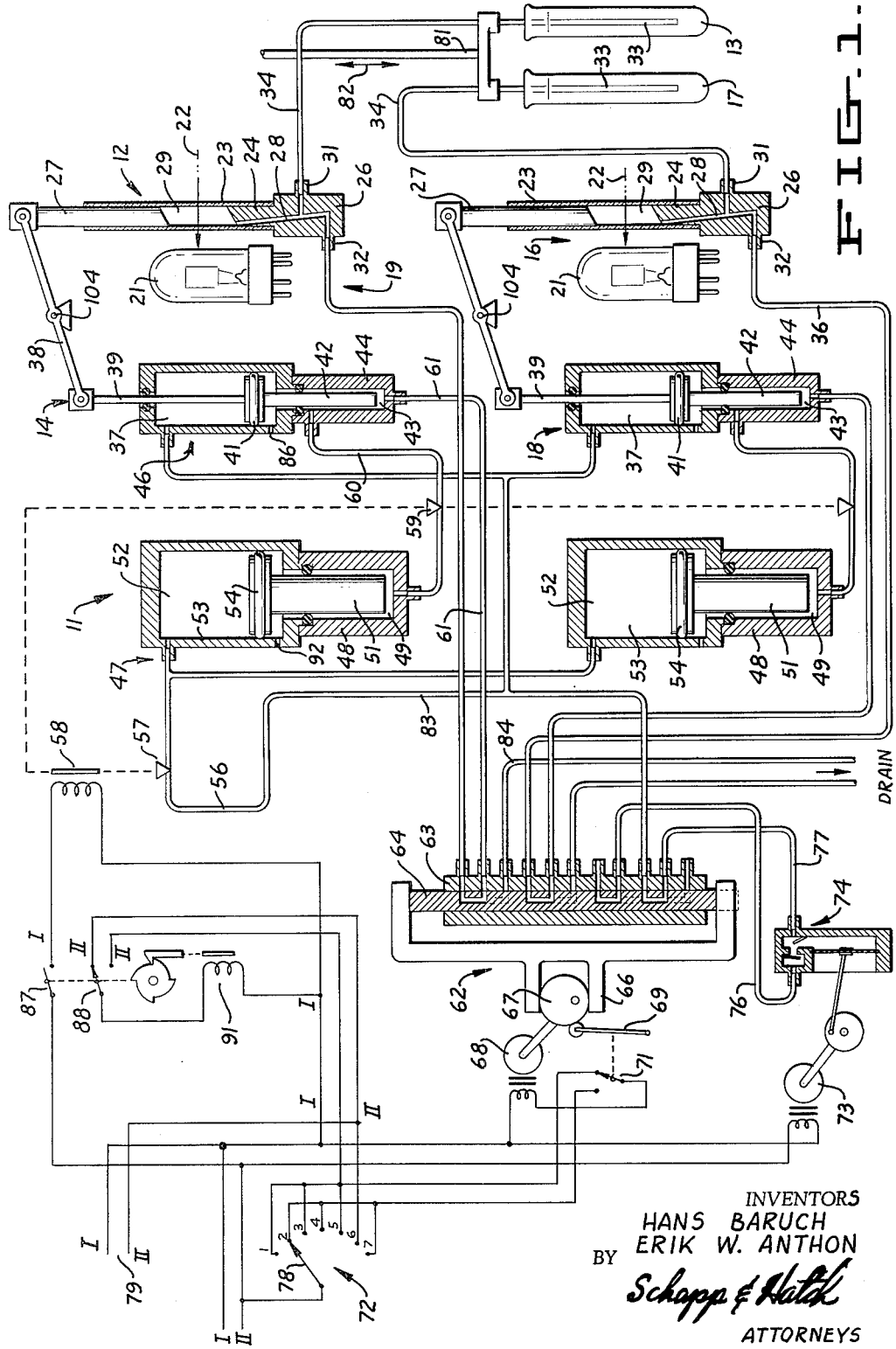

3,225,645
CUVETTE AND SUPPLY SYSTEM THEREFOR
Hans Baruch, Berkeley, and Erik W. Anthon, Kensington, Calif., assignors, by mesne assignments, to Warner-Lambert Pharmaceutical Company, Morris Plains, N.J.
Filed Oct. 4, 1962, Ser. No. 228,337
7 Claims. (Cl. 88—14)

The present invention relates to improvements in a Cuvette and Supply System Therefor and more particularly to a cuvette adapted to fit in operative position in a sensing device for an automated analytical system and an automatic supply system for moving sample into and out of the cuvette.

In certain types of analytical procedures, large numbers of routine determinations must be carried out. Particularly applicable are those employed in biochemical, physiological and medical laboratories where materials such as blood serum, tissue serum, urine, or other materials are tested and/or analyzed. Such tests are particularly suited for automation because the analytical procedures are repeated a large number of times.

In accordance with many of these procedures, the final measurement is made by a suitable sensing device capable of measuring a physical property which is indicative of the analytical results to be found. For example, many procedures call for the addition of reagents which develop color in an amount depending upon the concentration of a constituent in the sample. When the apparatus is to be fully automated and to be programmed to carry out such a procedure, it is necessary to provide means for holding the sample in operative position in the sensing device and to provide an automatic means for supplying samples to be determined in an orderly and known fashion to said means.

In accordance with the invention, the sensing device may be any type of instrument adapted to measure the physical properties of a substance contained in operative position therein. For example, physical properties such as color, ultraviolet absorption, fluorescence, or any other property utilized for analytical purposes may be measured with a sensing device adapted to measure such properties. The invention is particularly applicable for use with a spectrophotometer or colorimeter which measures color developments or similar optical properties utilized in analytical procedures.

The supply system may be any system capable of moving sample, which has been treated according to the necessary procedure for measurement of the physical property, from a site or location in the apparatus to a cuvette in the sensing device. However, it is important that the supply system be fully automated with its automation properly synchronized into the system, and it is also important to provide a system in which contamination by prior samples handled is completely eliminated.

In accordance with the invention, the cuvette is a container having walls of the proper physical properties, and the supply system comprises a group of pumps and pump controls which are capable of pumping sample material into and out of the cuvette.

It is the primary object of this invention to provide a cuvette and supply system therefor of the character described which is capable of moving treated sample into and out of position in a sensing system where a reading which gives the analytical result is made.

Another object of the invention is the provision of a method and apparatus for supplying a cuvette in which the cuvette is washed clean of prior sample by a portion of sample being brought in for measurement, and then the sample to be measured is brought into position for accurate determination.

A further object of the invention is to provide a cuvette and a supply system therefor which is capable of continued automatic operation over a long period of time and which is resistant to corrosive chemicals and atmospheres usually found in a laboratory.

A still further object of the invention is to provide a cuvette and supply system of the character described which is easily constructed, simple in operation and reliable and accurate in the results obtained.

Further objects and advantages of our invention will be apparent as the specification progresses, and the new and useful features of our cuvette and supply system therefor will be fully defined in the claims attached hereto.

In its broad aspect, our invention provides a cuvette which has a pump associated therewith for moving treated sample into a container and moving treated sample out of the container. In the process form, the invention operates to utilize sample material to rinse away prior contaminants and leave the container clean except for small amounts of the sample utilized for rinsing. Then the new sample is pumped into the container so that a reading may be taken on materials substantially unaffected by prior samples handled.

In its preferred form, the cuvette is constructed with a pump as an integral part thereof, with a cylinder and plunger operating within the cylinder with the cylinder serving as the container for the sample to be measured. In this way, the pump is used to bring in and remove sample from the cuvette. In order to provide the proper flow of liquid, two lines communicate into the cuvette, one of which brings in the sample while the other takes sample out toward a drain or other system. In order to provide proper flow of liquid, a suitable valving system is used which acts in cooperation with the pump to insure the necessary flow of liquid.

Although it is possible to carry out the method of the invention with a minimum of apparatus, we prefer to utilize a plurality of pumps which are driven by air pressure and a valve system which operates all pumps and regulates the associated fluid lines in one operation. In this way, the valve operations are automated by any suitable control systems and the operation of the system follows from the positioning of the valves.

The preferred form of our invention is illustrated in the accompanying drawings forming part of this description, in which:

FIGURE 1 is a schematic showing of a complete dual system for loading a cuvette with sample to be determined, and loading another cuvette with a blank sample so that a difference comparison can be made in the spectrophotometer utilized in the illustration;

FIGURE 2, is an enlarged cross-sectional view of a portion of the apparatus illustrated in FIGURE 1 showing certain of the components in greater and additional detail;

FIGURE 3, is a sectional view similar to that shown in FIGURE 2 which illustrates the use of the apparatus with a smaller cuvette; and FIGURE 4, is a cross-sectional view taken substantially in the plane of line 4—4 of FIGURE 2.

While we have shown only the preferred form of our invention in the drawings, it should be understood that various changes or modifications may be made within the scope of the claims attached hereto without departing from the spirit of the invention.

Referring to the drawing in greater detail, there is shown in FIGURE 1 a liquid handling system 11 which comprises a cuvette 12, a sample site 13 and a pump system 14 for moving sample from the sample site into the cuvette and for removing sample from the cuvette. In addition, the system shown also comprises a cuvette 16 adapted to receive blank sample from a blank sample container 17, and a pump system 18 for moving blank sample into an out of the cuvette 16. Thus, a dual system is shown with the cuvette 16 being similar to the cuvette 12, and the pump system 18 being similar to the pump system 14. Accordingly, a description given below for the cuvette 12 and the pump system 14 is also applicable to cuvette 16 and pump system 18, and the similar parts of the two systems are similarly numbered.

In the system shown, the cuvette 12 and the cuvette 16 are both carried in a spectrophotometer 19 which contains a pair of photosensing tubes 21 and means (not shown) for providing light rays as indicated by arrows 22 through the sample and blank simultaneously and to the photosensing tubes 21.

As here shown, the cuvettes 12 and 16 each comprise a cylindrical housing 23 made of precision bore glass tubing, a bottom plug 24 which fits into an adapter 26, and a plunger 27. The bottom plug is preferably made of Teflon and has a sloping top with its lower portion adjacent to a wall of the cylindrical housing. In order to bring liquid into and out of the cuvette through the bottom plug 24, a passage 28 is located therein, and the passage has its upper end in communication with a chamber 29 defined by the housing 23 at the lowest point of the chamber or at the bottom part of the sloping bottom 24. It has been found that the sloping bottom allows almost complete draining of the liquid from the cuvette since the last drop will seek the sharpest corner between the sides and the bottom.

In other words, the sloped bottom of the cuvette allows complete draining of the contents because the capillary action will draw the last drop into the sharpest corner. The same effect can be obtained by using a flat bottom plug that has been chamferred eccentrically to provide a sharp angle between the wall of the cuvette and the bottom plug. The passage 28 communicates to the point of the deepest chamfer where the last drop is drawn.

Adapter 26 has two side arms 31 and 32 with arm 31 in communication with a probe 33 through a line 34, and arm 32 in communication with a fluid line 36. Line 36 is used to carry away liquid from the cuvette, and also to clear the probe and sample tube.

The fluid line 34 connecting the probe and cuvette is smooth without joints or irregularities that may cause holdup of liquid and cross-contamination between samples. The use of valves in line 34 is also avoided for the same reason.

The plunger 27 is constructed to slide sealingly within the housing 23, and has an end shaped to match the configuration of the bottom plug 24. In this way, the plunger acts as a pump that draws liquid into an expels liquid out of the chamber 29. The fit is also tight enough that the plunger keeps the walls of the glass tube clean and removes any film that might otherwise collect thereon.

The plunger is moved up and down by an air cylinder 37 through a rocker arm 38 which is connected to a piston arm 39 of a piston 41 carried in the air cylinder. A plunger 42 is also attached to the piston 41, and this plunger fits into a chamber 43 defined by a housing 44. The chamber 43 and the pump means for changing its volume will be referred to hereinafter as small scavenging cylinder 46. It is seen from FIGURE 1 of the drawing that air cylinder 37 simultaneously operates the small scavenging cylinder and plunger 27. With this operation, the small scavenging cylinder takes in liquid while the cuvette is emptied of its contents, and while the cuvette takes in liquid the small scavenging cylinder expels liquid. This operation is important because the small scavenging cylinder prevents the cuvette from emptying its contents back through the probe 33. In order to achieve this result, the small scavenging cylinder should be constructed to draw in a larger amount of liquid than is discharged by the cuvette.

In order to clear the system of excess sample liquid, a large scavenging cylinder 47 is provided. This cylinder is similar in construction to the small scavenging cylinder and operates by air pressure. Thus, the large scavenging cylinder comprises a housing 48 enclosing a chamber 49 in which a plunger 51 reciprocates to create a difference in the volume of chamber 49. This reciprocation is provided by an air cylinder 52 comprising a housing 53 having a piston 54 which is attached to plunger 51 and mounted for axial reciprocation.

Air pressure or vacuum is supplied to the air cylinder 52 through a line 56 which is controlled by a valve 57 operated by a solenoid 58. This valve 57 is provided because the large scavenging cylinder only operates at the end of a cycle of operation to remove excess sample from the system. Similarly, a valve 59 is provided in line 60 extending between the large and small scavenging cylinders, and this valve is also controlled by solenoid 58. Accordingly, the valves 57 and 59 are normally closed and the liquid in the large scavenging cylinder does not affect the flow of liquid in other parts of the system. Instead, flow of fluids in the remainder of the system is effected by valve 62.

In general, valve 62 may be any valve capable of providing the desired changes in the fluid lines connected thereto, and the size of the valve will vary somewhat on the system utilized. For example, a dual system is shown in FIGURE 1. However, it will be appreciated that a single system could be used, and in such a case certain of the valve positions may be eliminated. As here shown, valve 62 comprises a cylindrical valve unit 63 having passages therein adapted to align with passages in a valve member 64 sliding within the cylindrical valve unit 63.

Valve member 64 is positioned to provide the communication of liquid lines and air lines as shown, or to provide the communication shown in phantom. Adjustment of the position is obtained by reciprocating motion of valve member 64 which in turn is moved by a frame 66. Frame 66 is moved by an eccentric 67 driven by motor 68 at half revolutions. These half revolutions are provided by the action of a cam 69 which shuts off a switch 71 by positioning it to its other contact. At the other contact, the switch is in position to provide current to the motor for the next half revolution and be positioned back again. In this way, each time the motor 68 receives an electrical impulse from a master control system 72, the valve is positioned in the opposite direction and the pumps operate to provide the fluid flow required at the time.

As indicated above, any valve capable of achieving the desired result may be used, provided it gives the desired number of fluid line positions, and may be programmed automatically to carry out the pumping steps required. These pumping steps include transfer of sample into the cuvette, removal of the sample from the cuvette, and cleaning of the cuvette. A preferred valve and mechanism for operating the same is described and claimed in the copending United States patent application Serial No. 183,506, filed March 19, 1962, entitled, Valve, by Erik W. Anthon, an inventor in the present application.

As here shown, the system is controlled electrically, and line current is supplied through lines I and II when the apparatus is turned on. Thus, it is seen that current is continuously supplied to a motor 73 which drives an air compressor 74 to provide air pressure and vacuum to the system through pressure line 76 and suction line 77. The other operations are controlled in seven steps by the seven positions in the master control system. As here shown, the master control system comprises a step switch or switch arm 78 adapted to control the connection with line 2 through any one of the seven circuits shown. In this way, the sample is moved into position, and the spectrophotometer readout is activated by supplying a line impulse to line 79 at the proper timed sequence.

In operation, the last step of a complete cycle is the drawing up of all excess sample into the large scavenging cylinder, which also draws air into lines 34, 36 and 61. The probes 33 are constructed of a material having a hydrophobic surface and therefore are substantially free of sample material after the large scavenging cylinder draws the material therethrough. However, is desired, the probe 33 may be moved to a wash site and then to the next sample for pumping sample material into the cuvette.

Any suitable transfer device may be used such as a device moving frame 81, which carries the probes in a reciprocating motion as indicated by arrow 82, while the containers 33 are moved by independent conveying means (not shown). Examples of typical devices capable of effecting the desired transfer of the probe may be found in the copending patent application of Erik W. Anthon, an inventor in the present application, Serial No. 61,206, entitled Materials Handling Apparatus, filed October 7, 1960; the copending application of Hans Baruch, an inventor of the present invention, and Dalny Travaglio, Serial No. 207,123 filed July 2, 1962, entitled Apparatus For Conducting Analytical Procedural Steps, and assigned to the same assignee as the present application; and the copending application of Hans Baruch, an inventor of the present invention, and Dalny Travaglio, Serial No. 207,121, filed July 2, 1962, entitled, Apparatus for Performing Analytical Procedures, and assigned to the same assignee as the present application.

With the probe 33 in place, switch arm 78 is moved to the position of contact 1 to drive motor 68 and cause valve 62 to assume the position with the passages as shown in phantom. With this valve position, pressure line 76 is in communication with air line 83 to pressurize the chamber above piston 41 and cause it to move downwardly. Piston 54 is unaffected because valve 57 in line 56 is closed. As piston 41 moves downwardly, liquid is expelled from the small scavenging cylinder through liquid line 61 to drain line 84. In this way, liquid line 61 is cleared of air. At the same time, plunger 27 of cuvette 12 moves upward to bring sample into probe tube 33. With these operations completed, switch arm 78 moves to position 2.

At position 2, the valve 62 moves to the position shown with air line 83 in communication with the vacuum or suction line 77 of the compressor so that a reduced pressure is provided in chamber 37 of the small scavenging cylinder. In this position, atmospheric pressure which is available through vent 86 forces the piston 41 upward and this movement also forces plunger 27 downward. In this way, all air is cleared from the cuvette and this is drawn through line 36 into chamber 43 of the small scavenging cylinder as plunger 42 moves upward. It is important to provide a larger change in volume in the small scavenging cylinder than in the cuvette so that liquid does not return back through the probe. However, it is seen that a small amount of such return would not be harmful because the liquid in the probe is sample just drawn.

After sufficient time has been allowed for the operation to be completed, the arm 78 is moved to position 3 by the master timer 72 and the pump 62 moves back so that the passages shown in phantom are again in communication with the fluid lines as shown. At position 3, sample is drawn into the cuvette and the small scavenging cylinder is emptied into line 61. However, the small scavenging cylinder is connected to drain line 84 and line 36 is shut off so that fresh sample is drawn up into the probe and into the cuvette 12. This material is used to clean out the cuvette and wash away any trace contaminants that might be present from prior samples. Accordingly, the timer 72 moves the switch arm to position 4 and the valve 62 moves back to position shown in solid lines so that the small scavenging cylinder again draws in the liquid from the cuvette.

The timer then moves the switch to position 5 where the cuvette is refilled while the small scavenging cylinder discharges its contents to drain as before. The switch is then moved to position 6, but at this position no change is made in the position of valve 62 so that the small scavenging cylinder remains drained and the line 83 is still connected to the valve pressure side of air compressor 74. However, at position 6 the solenoid 58 is activated to open valves 57 and 59 in the line leading to the large scavenging cylinder. This causes air cylinder 52 to be pressurized so that piston 54 and plunger 51 move downward to empty chamber 49 through lines 60 and 61 which are connected to the drain. At the same time, readout circuit 79 is activated so that a measurement is made by the spectrophotometer or other devices associated with the system of this invention. Control of the circuitry to the solenoid 58 and the readout circuit 79 is effected by switches 87 and 88 which are operated by ratchet cam 89 through solenoid 91.

After these movements are completed, the switch arm 78 moves to position 7 where valve 62 is moved to the reverse position, and the large and small scavenging cylinders are operative through the vacuum in line 77. Thus, atmospheric pressure enters air cylinder 52 through vent 92 and the large scavenging cylinder operates to remove all sample from the sample site 13 through probe 33. This is accomplished by providing the larger volume change in the large scavenging cylinder than the volume of sample likely to be carried during the procedure. In this way, the probe is also cleared of sample by having air drawn therein. At the same time, the cuvette is draining and all of the sample is forced out of the cuvette. In other words, all of the sample in the system is drawn into the large and small scavenging cylinders.

At this time, the probe is moved to position in the next sample, and then the master control timer can be moved back to position 1 for repetition of the cycle as described above.

If desired, the large scavenging cylinder may be replaced by a vacuum bottle with the vacuum being supplied by the compressor or other convenient means. The spent liquid accumulates in the bottle which is large enough so that it will hold large amounts of liquid to minimize the need for emptying. The flow of liquid into the bottle is controlled by valve 59 which is opened when the timer 72 reaches contact 7, and valve 57 is eliminated.

As best seen in FIGURES 2 through 4, the cuvette is adapted to be held in operative position in a spectrophotometer or the like, and various sizes of cuvettes may be used if desired. As best seen in FIGURE 2, the spectrophotometer is carried in the same housing as the pumping system of this invention, and the holding means for the cuvette comprises a housing 93 having opening 94 therein, and clamping means 96 adapted to accommodate and hold various sized cuvettes. In general, this clamping may be effected by any suitable means. As here shown, the openings 94 of housing 93 have a V-shaped configuration in a pair of positions so as to hold various sized cuvette cylinders. Clamping means 96 contains a pin 97 which is urged against the cuvette by means of spring 98, and which may be brought away from the cuvette manually through handle 99.

The rocker arm 38 which operates between piston arm 39 of the small scavenging cylinder and plunger 27 of the cuvette may be easily removed from the plunger 27 so as to affect a change of cuvettes. This arm is also carried therein by the cross slot 101 as best seen in FIGURE 2 so that leverage may be effected with various sizes of cuvettes. In addition, rocker arm 38 may be positioned at any number of a number of pivots such as pivots 102 and 103 of fulcrum means 104. In this way, the length of the strokes of the plunger 27 may be varied as desired with different sizes of cuvettes. Thus, as shown in FIGURE 3, fulcrum 102 is used with a small cuvette, and pivot 103 is used with a large cuvette as shown in FIGURE 2. With this arrangement, more volume may be drawn into the small cuvette to assist in washing it out, while the stroke in the large cuvette may be shortened to insure that the small scavenging cylinder will draw more liquid than the cuvette. Thus, out of the different fulcrums may provide a given volume of sample displacement, regardless of cuvette size, if desired.

The apparatus may be constructed of any suitable materials which are chemically resistant, but we prefer to use precision bore glass tubes for the cuvettes, and to use a Teflon plunger and plug therein. Other materials which are preferably used include polypropylene tubing and Viton rubber O-rings on the pump pistons. These materials are eminently satisfactory in providing long wear and resistance to chemical attack.

From the foregoing description, it is seen that we have provided a self-cleaning, fully automated system for moving samples into reading position in a cuvette, and for removing said samples from the cuvette and cleaning same for the next operation. It is also seen that we have provided an improved form of curvette, which is specially constructed to be ready by a spectrophotometer, and to carry its own pump system for cleaning and filling the same.

We claim:

1. An apparatus for transferring a sample to a sensing device, comprising a sample site where sample is provided, a cuvette in the sensing device for receiving sample, a first duct in communication with said cuvette positionable to receive sample from the sample site, a piston carried in the cuvette for moving liquids into and out of the cuvette, a scavenging cylinder having a piston therein for collecting liquids removed from the cuvette, a second duct in communication with both the cuvette and the first duct and adapted to communicate with the scavenging cylinder, a scavenging cylinder duct adapted for communication with the second duct and to drain the scavenging cylinder, valve means for connecting the second duct to the scavenging cylinder duct for removing liquid from the cuvette and for disconnecting said ducts to drain the scavenging cylinder, and means for operating the pistons oppositely.

2. An apparatus for transferring a sample to a sensing device, comprising a sample site where sample is provided, a cuvette in the sensing device for receiving sample, a first duct in communication with said cuvette positionable to receive sample from the sample site, a piston carried in the cuvette for moving liquids into and out of the cuvette, a small scavenging cylinder having a piston therein and a common duct for collecting liquids removed from the cuvette, a second duct in communication with both the cuvette and the first duct and adapted to communicate with the common duct of the small scavenging cylinder, a large scavenging cylinder adapted for communication with the small scavenging cylinder, means for operating the large scavenging cylinder and establishing communication with the small scavenging cylinder at selected times, and valve means for connecting the common duct to the second duct to permit draining of the cuvette by the operating means operating the pistons oppositely and for disconnecting the common duct and draining these small scavenging means on successive strokes of the pistons under control of the operating means.

3. An apparatus for transferring sample to a spectrophotometer, comprising a sample site where sample is provided, a cuvette in the spectrophotometer for receiving sample, said cuvette having light permeable walls and a plunger for drawing in and expelling fluid from the cuvette, a first duct in communication with said cuvette positionable to receive sample from the sample site, a scavenging cylinder having a piston therein and a common duct for collecting liquids removed from the cuvette, a second duct in communication with the cuvette and adapted to communicate with the common duct of the scavenging cylinder, operating means to reciprocate the plunger and piston oppositely and valve means connecting the second duct to the common duct in one position for removing liquid from the cuvette by operation of the plunger and piston on one stroke and in another position to disconnect the second duct and drain the scavenging cylinder via the common duct on another stroke of the piston.

4. The apparatus defined in claim 3, in which means are provided for interconnecting the plunger and the piston so that one expels fluid while the other draws fluid in.

5. A cuvette adapted to receive and hold liquid sample in automated equipment, comprising a housing having side walls and a bottom defining a chamber for holding liquids, said bottom having an inclined surface with the lowest portion thereof at a wall of the housing, a plunger adapted to reciprocate in said housing having side walls and a bottom in a matching configuration with said housing, walls defining a passage in said bottom in communication with said chamber, at the lowest portion of the inclined surface, and an ingress and an egress duct in communication with said passage through the last mentioned walls.

6. Apparatus for fluid handling comprising in combination a cuvette including a piston moveably communicating with the internal side walls thereof, a first duct providing fluid ingress to the cuvette, an egress duct providing fluid egress from the cuvette, reciprocating piston type scavenging means having a common fluid duct adapted for communication with the egress duct for draining fluid from the cuvette, the capacity of the scavenging means exceeding in volume the capacity of the cuvette and ducts therebetween, operating means for the cuvette and scavenging means selectively to cause fluid ingress and egress relative thereto, valve means adapted in one position to interconnect the egress duct and the common duct to establish fluid flow from the cuvette and the ingress duct into the scavenging means via the egress duct and common duct and adapted in another position to disconnect the egress duct from the common duct to drain said scavenging means via the common duct under control of the operating means, said operating means interconnecting the pistons of the scavenging means and cuvette for emptying the cuvette when the scavenging means is intaking fluid.

7. The apparatus of claim 6 including further scavenging means adapted for communication with said first mentioned scavenging means and means for selectively draining the first mentioned scavenging means, the cuvette, the ingress duct, and ducts therebetween into said last mentioned scavenging means.

References Cited by the Examiner

UNITED STATES PATENTS

| 95,061 | 9/1869 | Wolf | 103—167 |
| 1,984,296 | 12/1934 | Witter | 222—334 |
| 2,806,148 | 9/1957 | Barton | 250—218 |
| 2,992,077 | 7/1961 | Schneider et al. | 88—14 |
| 3,084,592 | 4/1964 | Scott | 88—14 |
| 3,142,719 | 7/1964 | Farr | 88—14 |

FOREIGN PATENTS

| 685,624 | 1/1953 | Great Britain. |

JEWELL H. PEDERSEN, *Primary Examiner.*

O. B. CHEW, *Assistant Examiner.*